United States Patent
Horioka et al.

(10) Patent No.: US 6,373,494 B1
(45) Date of Patent: Apr. 16, 2002

(54) SIGNAL PROCESSING APPARATUS AND IMAGE PROCESSING APPARATUS

(75) Inventors: Toshio Horioka, Kanagawa; Ryohei Iida, Tokyo, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/237,833

(22) Filed: Jan. 27, 1999

(30) Foreign Application Priority Data

Jan. 29, 1998 (JP) .......................................... 10-017434

(51) Int. Cl.[7] .............................................. G06F 15/00
(52) U.S. Cl. ...................... 345/581; 345/582; 345/589; 345/606; 345/605; 345/600
(58) Field of Search ................. 345/581, 582, 345/589, 593, 600, 605, 606

(56) References Cited

U.S. PATENT DOCUMENTS

| | | | | |
|---|---|---|---|---|
| 5,706,481 A | * | 1/1998 | Hannah et al. ............. 395/519 |
| 5,767,858 A | * | 6/1998 | Dawase et al. ............. 345/430 |
| 5,835,096 A | * | 11/1998 | Baldwin ..................... 345/430 |
| 5,844,567 A | * | 12/1998 | Gossett et al. ............. 345/430 |
| 6,016,151 A | * | 1/2000 | Lin ............................ 345/430 |
| 6,111,584 A | * | 8/2000 | Murphy ..................... 345/430 |

\* cited by examiner

*Primary Examiner*—Matthew Luu
*Assistant Examiner*—Daniel J Chung
(74) *Attorney, Agent, or Firm*—Rader, Fishman & Grauer PLLC; Ronald P. Kananen

(57) ABSTRACT

A signal processing apparatus for linear interpolation capable of performing operations to obtain suitable original data even when an interpolation coefficient $\alpha$ is 1.0, wherein a correction term selects A when $\alpha=0\times FF$ ($\alpha=1.0$) and selects B when the bit is 0. The selected data becomes an element of addition by being shifted for the number of bits of $\alpha$. A product summation operation term uses the upper 8 bits of the result of multiplication of 8 bits×8 bits and shifts the 8-bit result of operation 8 bits to the left so as to enable further addition of the product summation operation term. An adder adds the shifted correction term, the partial products out_0 to out_7, and the product summation operation term and outputs the upper 8 bits as the result of the operation.

12 Claims, 5 Drawing Sheets

SIGNAL PROCESSING APPARATUS AND IMAGE PROCESSING APPARATUS

BACKGROUND OF THE INVENTION

1. Field of the Invention

The present invention relates to a processing apparatus which can perform a product summation operation at a high speed for, for example, linear interpolation, correction, etc. The present invention also relates to an image processing apparatus suitable for generating three-dimensional images in the field of computer graphics etc.

2. Description of the Related Art

Computer graphics are often used in a variety of computer aided design (CAD) systems and amusement machines. In particular, systems using three-dimensional computer graphics have spread rapidly, along with the recent advances in image processing technology.

In three-dimensional computer graphics, one of the most widespread techniques used is the polygon rendering system. In such a system, a three-dimensional model is expressed as an composite of triangular unit graphics (polygons). The polygons are drawn, the colors of the pixels of the display screen are decided, and then the model is displayed on the display screen.

In such rendering processing, for example, when generating pixel data between the vertexes of the triangles or inside the triangles based on the vertexes, processing for linear interpolation is performed frequently at the time of giving highlighting to the texture data, at the time of texture mapping, and at the time of giving a fog effect.

The processing for linear interpolation performed in such a case can be expressed by the following formula 1:

$$A \times \alpha + B \times (1-\alpha) \qquad (1)$$

When performing the signal processing for linear interpolation as shown in formula 1, a configuration using two multipliers and one adder or a configuration using one multiplier, one subtractor, and one adder can be easily considered in an ordinary case.

Also, a configuration can be considered using the processor shown in FIG. 5.

In the processor shown in FIG. 5, the operation $[A \times \alpha + B \times (1-\alpha)]$ can be developed to the operation $[A \times \alpha + B \times {}^-\alpha + B]$ (where ${}^-\alpha$ indicates a bit inversion of $\alpha$) and evaluated by adding the adding term $\underline{B}$ and partial products out_0 to out_7 selected corresponding to the bits of the variable a to the values shifted as shown in FIG. 5.

Note that the partial products out_0 to out_7 are values obtained for each bit of $\alpha$ by selecting $\underline{A}$ when the bit is "1" and selecting $\underline{B}$ when the bit is "0".

When performing the ordinary processing for linear interpolation as shown in formula 1 in an 8-bit processing system wherein, for example, the variables are 8-bit variables, if A=1, $\alpha$=1, and B=0 and performing normal multiplication, the operation shown in formula 2 is performed. When outputting the upper 8 bits as the result of the multiplication, the result is 0xFE.

$$0xFF \times 0xFF + 0 \times (1-0xFF) = 0xFE01 \qquad (2)$$

Note that FF indicates a hexadecimal number.

When mathematically considering 0 to 1.0 corresponding to 0x00 to 0xFF, $1.0 \times 1 \neq 1.0$ is obtained, which means that the correct result of the operation can no longer be obtained.

Accordingly, for example, when applying this processing for linear interpolation to the fogging of the above three-dimensional computer graphics system, even when setting the fog coefficient to 1.0 so as not to give any fog effect at all, there is the problem that the input original pixel data is affected by something or another and the original pixel data cannot be maintained.

Therefore, up until now, use has been made of the result of the operation output from the processor shown in FIG. 5 corrected when $\alpha$=1.0. With this, however, there is the problem that the size of the circuit becomes large. Especially, recently, there is a demand for forming such a processing circuit on an integrated circuit. In this case, there is the problem that the provision of the correction circuit outside the integrated circuit enlarges the size of the device, while provision inside enlarges the area of the circuit on the chip. It is desired to eliminate these problems in the circuit configuration.

When forming such an image processing circuit for a three-dimensional computer graphic system on an integrated circuit, it is desired to perform the product summation operation using such a linear interpolation processor. Until now, however, two stages have been used—a part for calculating the product and a part for calculating the sum— and therefore two processors are required. Therefore, it has been desired to make improvements in the circuit size and processing speed.

SUMMARY OF THE INVENTION

An object of the present invention is to processing apparatus for linear interpolation perform operations for obtaining original data suitable even when the interpolation coefficient $\alpha$=1.0, which can perform a product summation operation at a high speed, and which is suited for formation on an integrated circuit without increasing the size of the circuit much at all.

Another object of the present invention is to provide an image processing apparatus which uses such a processing apparatus and consequently can perform, for example, texture mapping, fogging, highlighting, and other image processing efficiently at a high which is suited for to formation on an integrated circuit.

The present inventors considered the fact that the error explained above was caused since it was attempted to make 0xFF (255) correspond to 1.0 in the value a and theorized that it would be possible to eliminate the error by further adding $\underline{A}$ so that $[\alpha+1]$ became 256. Then, they discovered that addition of $\underline{A}$ was possible by switching the +B term to +A in the basic formula of the circuit shown in FIG. 5, that is, $[A \times \alpha + B \times {}^-\alpha + B]$, in the case of $\alpha$=1.0. They further added a new term for carrying out a product summation operation and invented a processing apparatus capable of performing correction multiplication, processing for linear interpolation, and a product summation operation and an image processing apparatus capable of suitably using the processing apparatus for image processing.

Accordingly to a first aspect of the present invention, there is provided a signal processing apparatus for performing the operation $[A \times \alpha + B \times (1-\alpha)]$, wherein $\underline{A}$ and $\underline{B}$ are any values of a predetermined bit and $\alpha$ is a coefficient with a value of $0 \leq \alpha \leq 1$ of a predetermined bit width. The signal processing apparatus then obtains; the upper bits of the result of the operation. The signal processing apparatus includes (1); an added value selecting means for selecting the value $\underline{A}$ as the added value $\underline{F}$ when $\alpha$=1 and selecting the value $\underline{B}$ as the added value $\underline{F}$ when $\alpha \neq 1$; (2) and a processing means for performing the operation $[A \times \alpha + B \times {}^-\alpha + F]$ (where ${}^-\alpha$ indicates a bit inversion of $\alpha$) based on the selected added value $\underline{F}$.

Preferably, the processing means comprises (1) a partial product generating means for selecting the value $\underline{A}$ when the bit is 1 and selecting the value $\underline{B}$ when the bit is 0 for each bit of the coefficient a and generating a partial product by shifting the selected value to a position corresponding to the bit of the $\alpha$; and (2) an adding means for adding the selected added value $\underline{F}$ and the generated partial products of the number of bits of the $\alpha$.

Preferably, the adding means is configured by a Wallace-tree type architecture comprised of one-bit adders in a tree structure.

According to a second aspect of the invention, there is provided a signal processing apparatus for performing the operation $[A \times \alpha + B \times (1-\alpha) + C]$, where $\underline{A}$, $\underline{B}$, and $\underline{C}$ are any values of a predetermined bit width and $\alpha$ is a coefficient with a value $0 \leq \alpha \leq 1$ of a predetermined bit width, and for obtaining the upper bits of the result of the operation. The signal processing apparatus includes (1); an added value selecting means for selecting the value $\underline{A}$ as an added value $\underline{F}$ when $\alpha=1$ and selecting the value $\underline{B}$ as the added value $\underline{F}$ when $\alpha \neq 1$; and (2) a processing means for performing the operation $[A \times \alpha + B \times \overline{\alpha} + F + C]$ (where $\overline{\alpha}$ indicates a bit inversion of $\alpha$) based on the selected added value $\underline{F}$.

Preferably, the processing means comprises (1) a partial product generating means for selecting the value $\underline{A}$ when the bit is 1 and selecting the value $\underline{B}$ when the bit is 0 for each bit of the coefficient $\alpha$ and generating a partial product by shifting the selected value to the position corresponding to the bit of the $\alpha$; and (2) an adding means for adding the selected added value $\underline{F}$. the generated partial products of the number of bits of the $\alpha$, and the value $\underline{C}$.

Preferably, the added value selecting means, the processing means, the partial product generating means, and the adding means are formed as an integrated circuit.

According to a third aspect of the invention, there is provided an image processing apparatus, comprising a processing apparatus for performing the operation $[A \times \alpha + B \times (1-\alpha)]$, wherein $\underline{A}$ and $\underline{B}$ are any values of a predetermined bit width and $\alpha$ is a coefficient of a value of $0 \leq \alpha \leq 1$ of a predetermined bit width, and for obtaining the upper bits of the result of the operation. The processing apparatus includes (1); an added value selecting means for selecting the value $\underline{A}$ as the added value $\underline{F}$ when $\alpha=1$ and selecting the value $\underline{B}$ as the added value $\underline{F}$ when $\alpha \neq 1$; and (2) a processing means for performing the operation $[A \times \alpha + B \times \overline{\alpha} + F]$ (where $\overline{\alpha}$ indicates a bit inversion of $\alpha$) based on the selected added value $\underline{F}$ and (3) an input control means for respectively inputting to the processing apparatus texture mapping data as the value $\underline{A}$, the image data of the side on which the texture is applied as the coefficient $\alpha$, and 0 as the value $\underline{B}$ during a predetermined first mode.

Preferably, the input control means inputs to the processing apparatus pixel data as the value $\underline{A}$, a fog coefficient as the coefficient $\alpha$, and a fog color as the value $\underline{B}$ during a predetermined second mode.

Preferably, the processing means comprises (1) a partial product generating means for selecting the value $\underline{A}$ when the bit is 1 while selecting the value $\underline{B}$ when the bit is 0 for each bit of the coefficient $\alpha$ and generating a partial product by shifting the selected value to the position corresponding to the bit of the $\alpha$; and (2) an adding means for adding the selected added value $\underline{F}$ and the generated partial products of the number of bits of the $\alpha$.

According to a fourth aspect of the invention, there is provided an image processing apparatus, comprising a processing apparatus for performing the operation $[A \times \alpha + B \times (1-\alpha) + C]$, wherein $\underline{A}$, $\underline{B}$, and $\underline{C}$ are any values of a predetermined bit width and $\alpha$ is a coefficient of a value of $0 \leq \alpha \leq 1$ of a predetermined bit width and for obtaining the upper bits of the result of the operation. The processing apparatus includes (1); an added value selecting means for selecting the value $\underline{A}$ as an added value $\underline{F}$ when $\alpha=1$ and selecting the value $\underline{B}$ as the added value $\underline{F}$ when $\alpha \neq 1$; and (2) a processing means for performing the operation $[A \times \alpha + B \times \overline{\alpha} + F + C]$ (where $\overline{\alpha}$ indicates a bit inversion of $\alpha$) based on the selected added value $\underline{F}$; and (3) an input control means for inputting to the processing apparatus texture mapping data as the value $\underline{A}$, image data of the side on which the texture is applied as the coefficient $\alpha$, and 0 as the values $\underline{B}$ and $\underline{C}$ during a predetermined first mode.

Preferably, the input control means inputs to the processing apparatus pixel data as the value $\underline{A}$, a fog coefficient as the coefficient $\alpha$, a fog color as the value $\underline{B}$, and 0 as the value $\underline{C}$ during the second mode.

Preferably, the input control means inputs to the processing apparatus texture mapping data as the value $\underline{A}$, a value indicating an ambient light as the coefficient $\alpha$, 0 as the value $\underline{B}$, and a value indicating a specific light source as the value $\underline{C}$ during a predetermined third mode.

Preferably, the processing means comprises (1) a partial product generating means for selecting the value $\underline{A}$ when the bit is 1 and the value $\underline{B}$ when the bit is 0 for each bit of the coefficient $\alpha$and for generating a partial product by shifting the selected value to the position corresponding to the bit of the $\alpha$ and (2) an adding means for adding the selected added value $\underline{F}$, the generated partial product of the number of bits of the $\alpha$, and the value $\underline{C}$.

Preferably, the means are formed on an integrated circuit.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments of the invention will be described with reference to FIGS. 1 to 4.

In the present embodiment, an explanation will be made of the case where a processing apparatus and an image processing apparatus of the present invention are used in a three-dimensional computer graphic system which displays a desired three-dimensional image of any three-dimensional object model on a display screen at a high speed, which is often used in a home game machine.

Figure 1:
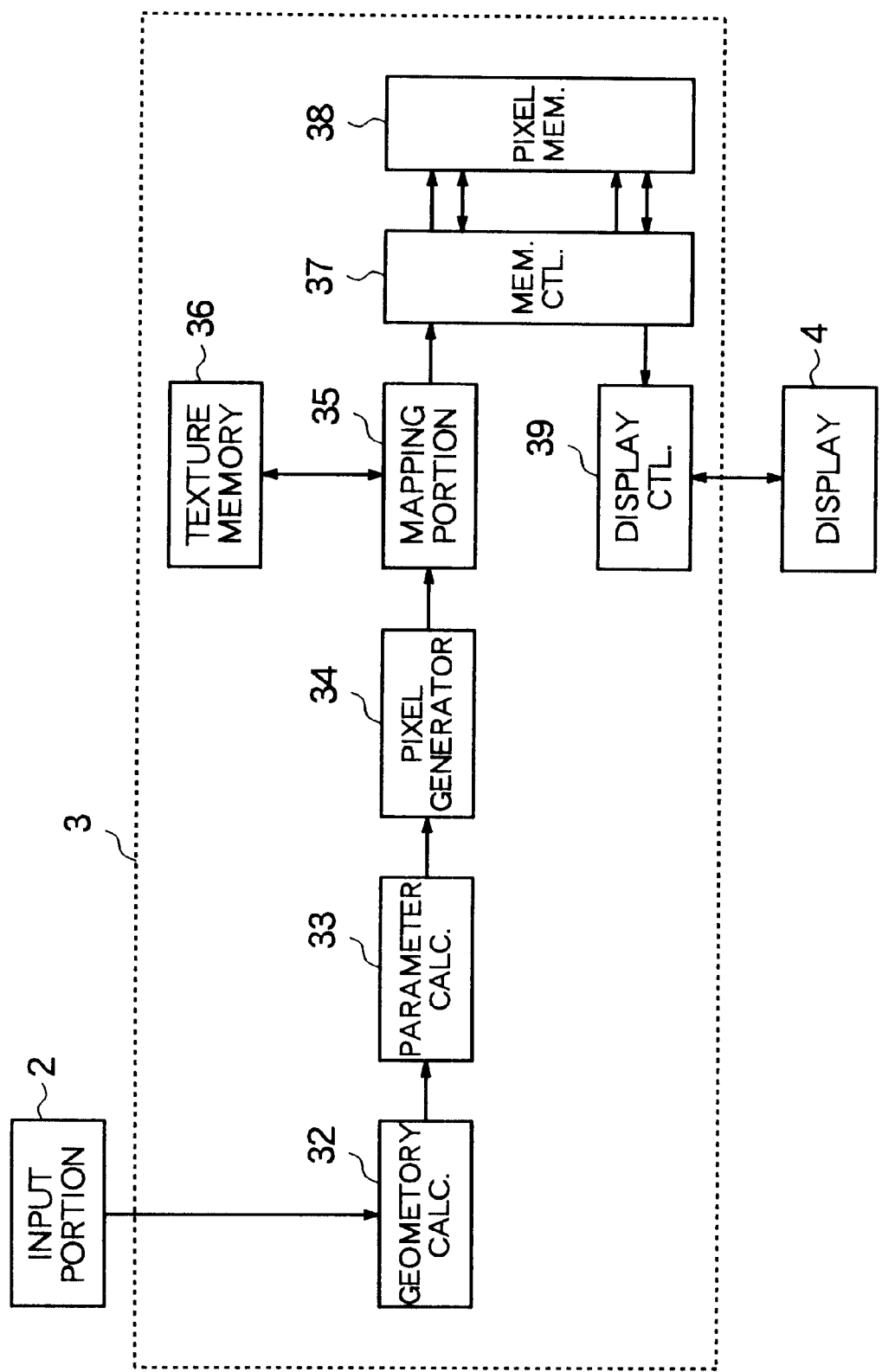
FIG. 1 is a block diagram of the configuration of a three-dimensional computer graphic system of an embodiment of the present invention.

FIG. 1 is a block diagram of the configuration of a three-dimensional computer graphic system 1.

First, the three-dimensional computer graphic system will be explained with reference to FIG. 1.

This three-dimensional computer graphic system 1 expresses a three-dimensional model as a composite of triangular unit graphics (polygons). The polygons are drawn, the colors of the pixels of the display screen are decided, and then the model is displayed on the display screen.

Also, the three-dimensional computer graphic system 1 expresses a three-dimensional object by using a coordinate z indicating a depth of the object in addition to two-dimensional (x, y) coordinates indicating a plane. Any point in three-dimensional space can be specified by the three-dimensional coordinates (x, y, z).

The three-dimensional computer graphics system 1 comprises an input unit 2, a three-dimensional image generator 3, and a display device 4.

The three-dimensional image generator 3 comprises a geometry processing unit 32, a parameter processing unit 33, a pixel generation unit 34, a mapping unit 35, a texture memory 36, a memory control unit 37, an image memory 38, and a display control unit 39.

First, the configurations and functions of each portion will be explained.

The input unit 2 receives as input data, a three-dimensional model to be displayed on the display 4 by the three-dimensional image generator 3.

In the present embodiment, the three-dimensional computer graphic system 1 is used for a home game machine, so the input unit 2 is connected to a main controller etc. for controlling the game of the home game machine. The main controller decides the screen to be display based on the progress of the game etc., selects a three-dimensional model required for the screen display, and generates information for the method of display. Accordingly, the input unit 2 receives polygon data of a three-dimensional model of an object to be displayed and other information, converts this to a mode suitable for input to the three-dimensional image generator 3, and inputs the data to the geometry processing unit 32 of the three-dimensional image generator 3. Note that the input polygon data includes data of (x, y, z) coordinates of the vertexes and additional data such as colors, degrees of transparency, and textures.

The geometry processing unit 32 arranges the polygon data input from the input unit 2 at desired positions in a three-dimensional space and generates polygon data at the positions. Specifically, for each vertex (x, y, z) of every polygon, geometric conversion such as a parallel motion conversion, parallel conversion, and rotation conversion is carried out. The polygon data, after the geometric conversion is completed, is output to the parameter processing unit 33.

The parameter processing unit 33 obtains parameters required by the pixel generation unit 34 for generating pixel data inside the polygon based on the polygon data input from the geometry processing unit 32, that is, the data of the vertices of the polygon. The parameter processing unit 33 outputs the data to the pixel generation unit 34. Specifically, information of, for example, colors, depths, inclinations of textures, etc. are obtained.

The pixel generation unit 34 carries out linear interpolation between the vertices of the polygons based on the polygon data after the geometry conversion in the geometry processing unit 32 and based on the parameters obtained in the parameter processing unit 33. After linear interpolation, the unit 34 generates pixel data of the inside and edge portions of the polygons. Also, the pixel generation unit 34 generates an address on a predetermined two-dimensional plane corresponding to the display of the pixel data. The generated data and the address are successively input to the mapping unit 35.

The mapping unit 35 reads the pixel data and the address generated in the pixel generation unit 34, carries out texture mapping etc., and decides a color value for each pixel. Specifically, the mapping unit 35 performs texture mapping using the texture data stored in the texture memory 36 and a fogging using a desired fog color and the data of a fog coefficient. Note that the processing is performed by using a processing apparatus explained in detail later on. The pixel data and the address after these processings are output to the memory control unit 37.

The texture memory 36 is a memory for storing texture patterns used for texture mapping in the mapping unit 35. In the present embodiment, the texture data is stored as index data in this texture memory 36.

The memory control unit 37 generates new pixel data based on pixel data and an address input from the mapping unit 35 and the corresponding pixel data already stored in the image memory 38 and stores the same in the image memory 38. Namely, the memory control unit 37 reads from the image memory 38 the pixel data corresponding to the address input from the mapping unit 35, performs a desired processing on the pixel using the pixel data and the pixel data input from the mapping unit 35, and writes the obtained pixel data in the image memory 38.

Also, when a display region is specified by the display control unit 39, the memory control unit 37 reads the pixel data of the specified display region from the image memory 38 and outputs the same to the display control unit 39.

The image memory 38 is a memory for storing the image data for display and has two memory buffers, a frame buffer and a Z buffer, which can be accessed substantially simultaneously. Frame data, that is, color information of each pixel, is stored in the frame buffer. Z data, which is depth information of each pixel (Z value), is stored in the Z buffer.

The display control unit 39 converts the pixel data of the display region read from the image memory 38 via the memory control unit 37 into, for example, a predetermined analog signal which can be displayed by the display device 4 and outputs it to the display device 4.

Note that, prior to this procedure, the display control unit 39 makes a request to the memory control unit 37 for the pixel data of the display region to be displayed.

The display device 4 is, in this embodiment, a television receiver having a video input terminal etc. which is ordinarily used at home. An analog video signal is input from the display control unit 39 of the three-dimensional image generator 3 via a video signal input terminal. A three-dimensional graphic is displayed on the screen based on the analog video signal.

Next, the operation of this three-dimensional computer graphic system 1 will be explained.

First, when a three-dimensional image for display is required in the main control unit etc. for controlling the game of the home game machine, information of the three-dimensional model required for display is input to the input unit 2. The input unit 2 inputs the polygon data of the three-dimensional model for displaying the image into the three-dimensional image generator 3 based on the information.

First, geometry conversion such as parallel motion conversion, parallel conversion, and rotation conversion is performed in the geometry processing unit 32 on the polygon data input to the three-dimensional image generator 3 so that it is arranged at a desired position for display in three-dimensional space.

Next, the parameters necessary for generating the pixel data inside the polygons are obtained in the parameter processing unit 33 form the polygon data converted in coordinates. Then, the image generation unit 34 generates the pixel data of the inside and edge portions of the polygons by actually linear interpolation between the vertices of the polygons.

The generated pixel data is successively input to the mapping unit 35. In the mapping unit 35, the texture pattern data, that is, the index data stored in the texture memory 36, is converted to real color data. Then, the texture mapping is carried out by using the real color data, fogging is further carried out, and the generated pixel data is stored in the image memory 38 via the texture mapping. Note that when highlighting is desired, the highlighting is performed in advance on the texture pattern data.

The desired processing is suitably carried out on the pixel data stored in the image memory 38 based on other pixel data and any control data input from similar paths.

Accordingly, the latest image data is always stored in the image memory 38 and provided for screen display. Namely, the display control unit 39 makes a request to the memory control unit 37 for outputting the data of a predetermined region for display on the display device 4. Then, the pixel data in the specified region is read from the image memory 38, converted to a predetermined signal for screen display in the display control unit 39, and displayed on the display device 4.

Consequently, the desired image is displayed on the screen of the display device 4.

Next, the processing apparatus provided inside the mapping unit 34 for performing the above explained texture mapping, fogging, and highlighting will be explained with reference to FIG. 2.

Figure 2:
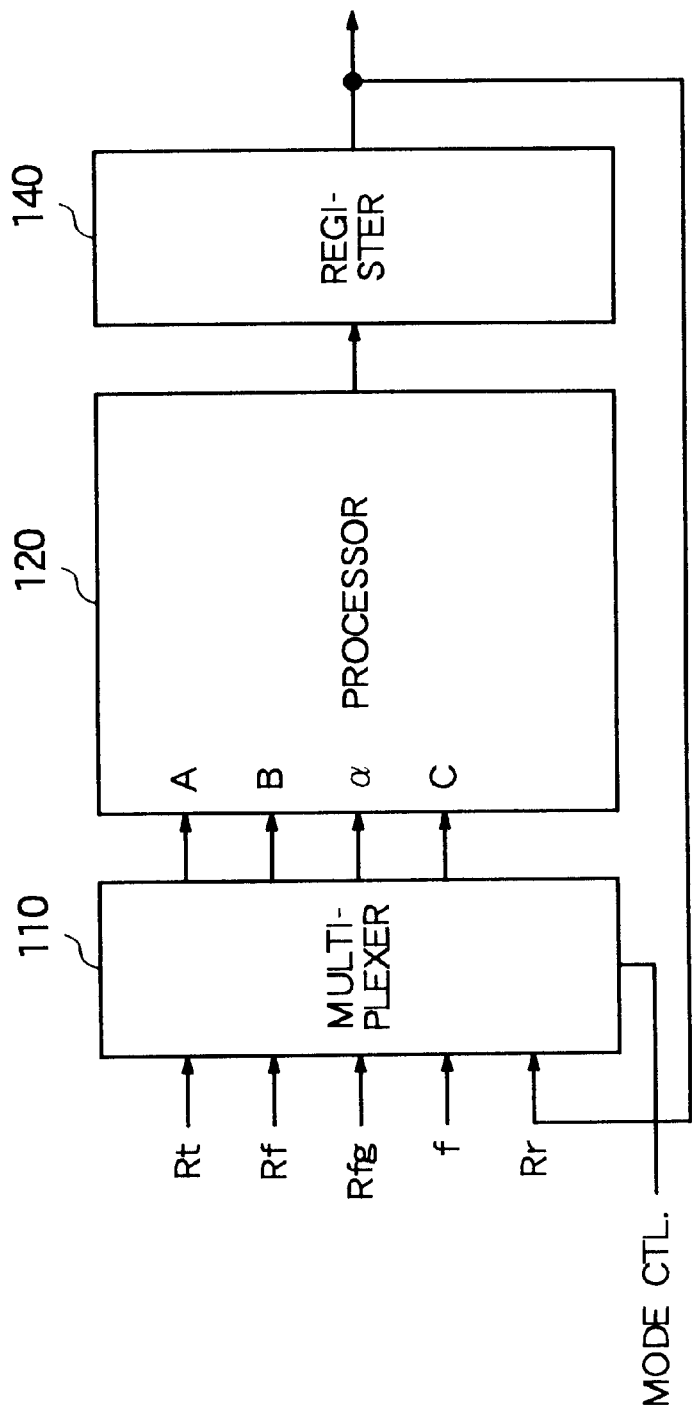
FIG. 2 is a block diagram of the configuration of a processing apparatus according to the present invention mounted inside a mapping portion of the three-dimensional computer graphic system shown in FIG. 1.

FIG. 2 is a block diagram of the configuration of the processing apparatus.

A signal processing apparatus 100 comprises a multiplexer 110, a processor 120, and a register 140.

The multiplexer 110 selects a predetermined variable from a plurality of variables supplied to the processing apparatus 100 and outputs it to the processor 120 so that a desired operation can be performed in the processor 120.

The multiplexer 110 receives as input some or all of the following texture mapping data Rt, image data Rf of a side to which the texture is applied, fog color Rfg, a fog coefficient $\underline{f}$, a specific ambient light $\underline{D}$, light $\underline{E}$ of a specified light source, etc. as well as the output of the register 140 as data Rr from the outside before the fogging. Based on a mode control signal separately input from the control unit of a not Illustrated three-dimensional image generator 3 indicating which processing is to be performed among multiplication, a product summation operation, or fogging, the multiplexer 110 respectively selects data of the variables in the operation $[A \times \alpha + B \times (1-\alpha) + C]$ from the input data and outputs it to the later explained processor 120.

More specifically, in the case of texture mapping and multiplication, the texture mapping data Rt is selected as the variable $\underline{A}$, the image data Rf of a side to which the texture is applied is selected as the variable $\alpha$, and 0 is selected as the variables $\underline{B}$ and $\underline{C}$ of the processor 120 and output to the processor 120.

Also, in the case of fogging, the data Rr before the fogging is selected as the variable $\underline{A}$, the fog coefficient $\underline{f}$ is selected as the variable $\alpha$, the fog color Rfg is selected as the variable $\underline{B}$, and 0 is selected as the variable $\underline{C}$ and output to the processor 120.

Further, in the case of multiplication such as highlighting, the texture mapping data Rt is selected as the variable $\underline{A}$, the ambient light $\underline{D}$ is selected as the variable $\alpha$, 0 is selected as the variable $\underline{B}$, and the light E of the specified light source is selected as the variable $\underline{C}$ and output to the processor 120.

The processor 120, according to the present embodiment, is an 8-bit processing unit for performing the operation $[A \times \alpha + B + (1-\alpha) + C]$ and capable of obtaining proper results even in the case of a $\alpha=1.0$ (0×FF).

Figure 4:
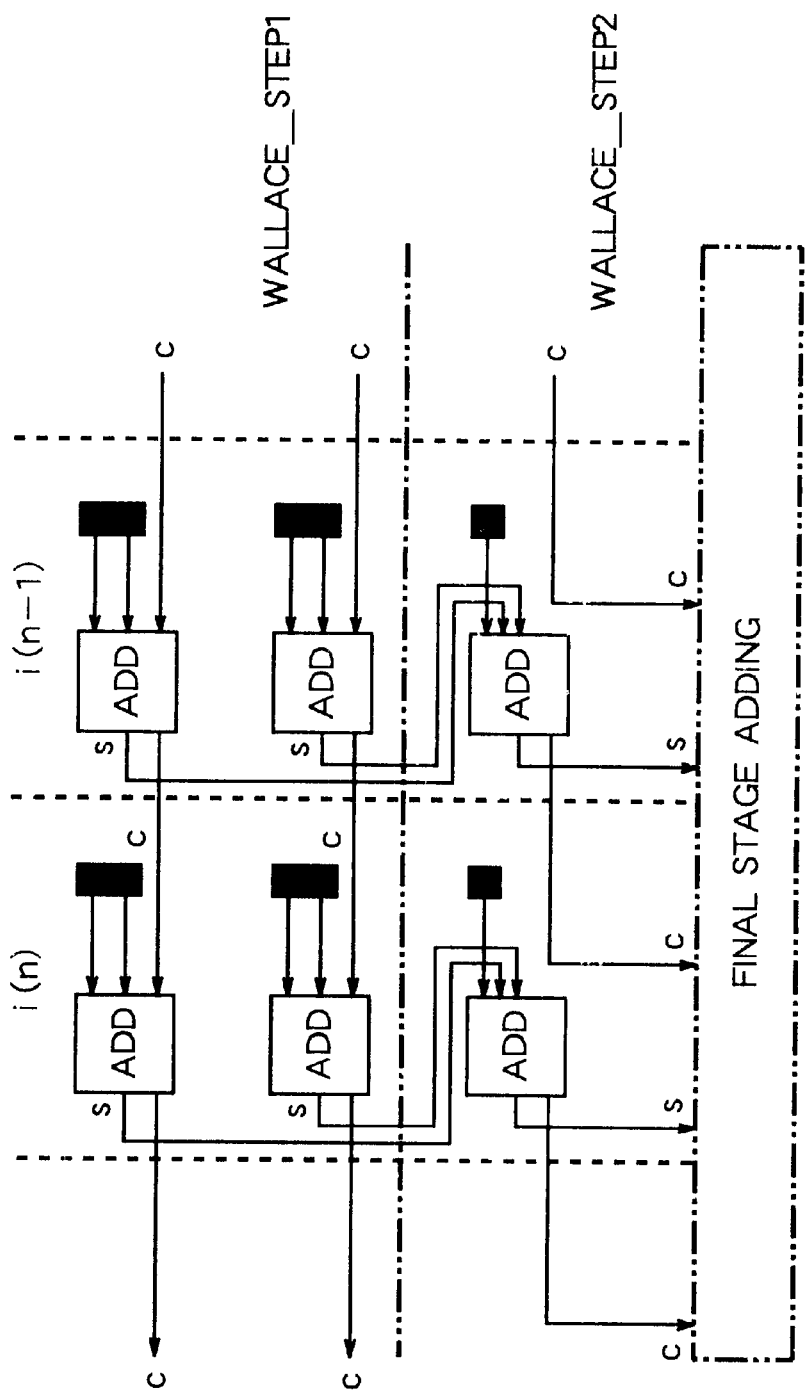
FIG. 4 is a view for explaining the configuration of an adder of the processing apparatus shown in FIG. 3.
Figure 5:
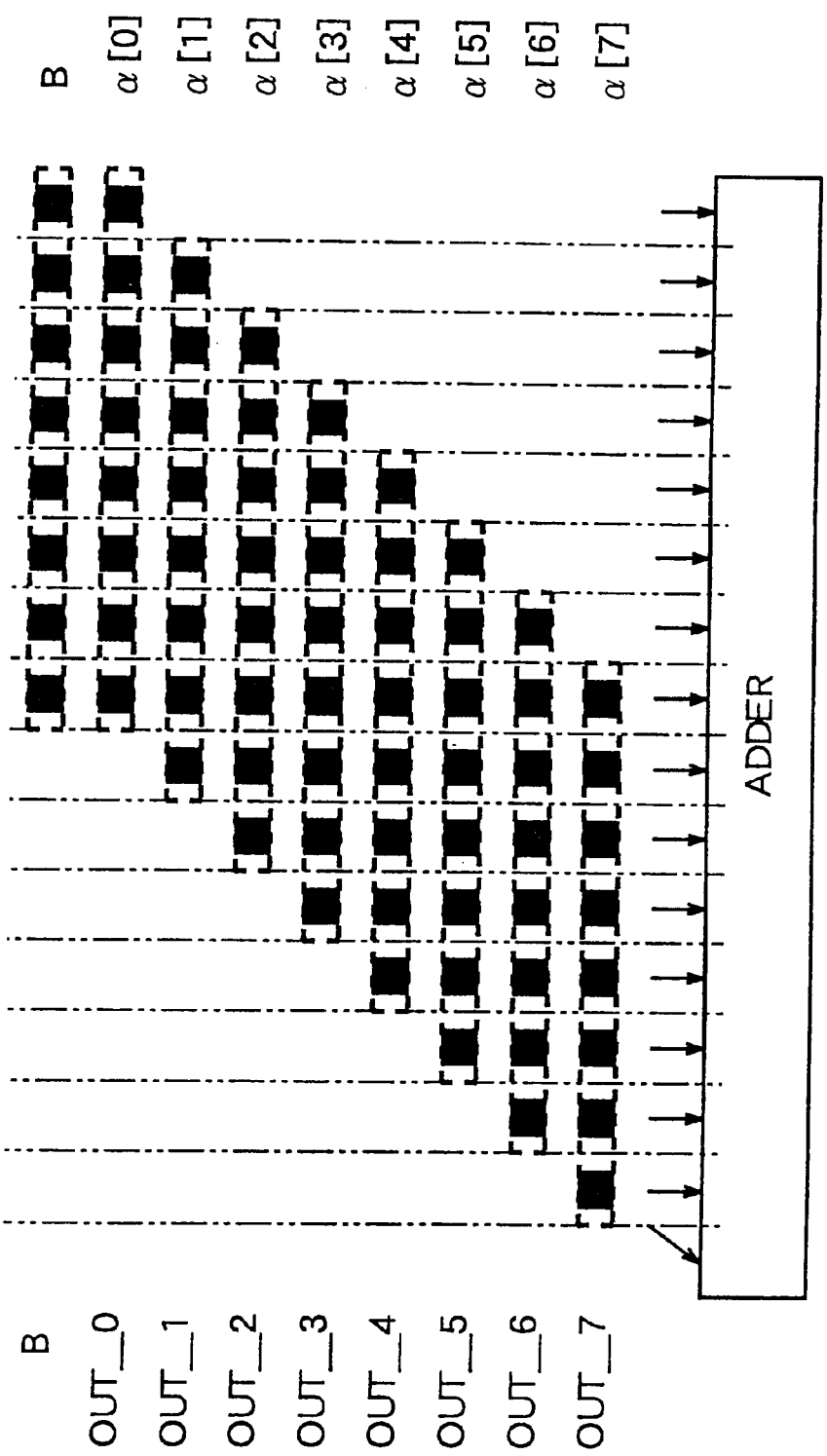
FIG. 5 is a view for explaining a processing means and the configuration thereof of a multiplier of the related art.

The configuration of this processor 120 will be explained next with reference to FIGS. 3 to 5.

Figure 3:
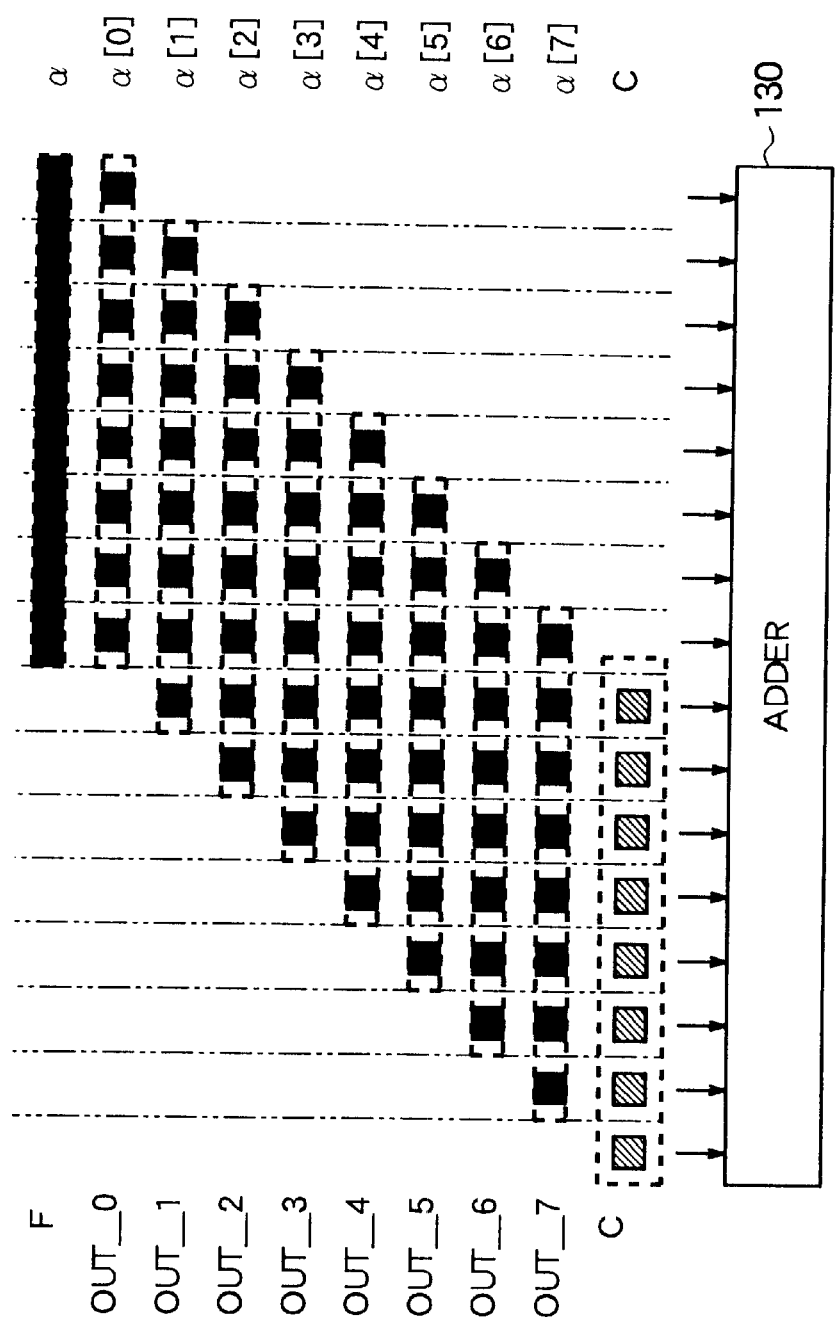
FIG. 3 is a view for explaining a processing means and the configuration thereof in the processor of the processing apparatus shown in FIG. 2.

FIG. 3 is a view for explaining the processing method and the configuration of the processor 120. It shows that the correction term $\underline{F}$, the partial products out$_0$ to out$_7$ selected in correspondence with bits of the variable $\alpha$, and the product summation operation term $\underline{C}$ can be obtained through $[A \times \alpha + B \times (1-\alpha) + C]$ by shifting and adding them as shown in FIG. 3.

The correction term $\underline{F}$ is a value obtained by selecting A when $\alpha=0 \times FF$ ($\alpha=1.0$) and selecting $\underline{B}$ in other cases. Note that FF indicates a hexadecimal number.

The partial products out$_0$ to out$_7$ are values obtained by selecting A when a bit is "1" and selecting $\underline{B}$ when the bit is "0" for each bit in $\alpha$. The selected data shifts to the left for the bit number of $\alpha$ and becomes elements of addition. Note that the bit number of $\alpha$ is the LSB (least significant bit, i.e., value of $2^0$) for the 0th bit and the MSB (most significant bit, i.e., value of $2^7$) for the 7th bit. Accordingly, when the value of the LSB (value of $2^0$) of $\alpha$ is 1, the out$_0$ becomes $\underline{A}$, while when the value is 0, the out$_0$ becomes $\underline{B}$. Also, when the value of the MSB (value of $2^7$) of $\alpha$ is 1, the out$_7$ becomes $\underline{A}$, while the value is 0, the out$_7$ becomes $\underline{B}$, and the value shifted for 7 bits to the left is added.

Regarding the product summation operation term $\underline{C}$, the upper 8 bits of the results of multiplication of 8 bits ×8 bits are taken to obtain an 8-bit result of operation which is then shifted 8 bits to the left in order that the product summation operation term $\underline{C}$ can be further added.

The adder 130 of the processor 120 adds the correction term $\underline{F}$ obtained as above and having shifted digits, the partial products out$_0$ to out$_7$, and the product summation operation term $\underline{C}$, and outputs the upper 8 bits of the result as the result of the operation.

In the present embodiment, the adder 130 is an adder having a Wallace-tree type architecture adder. This Wallace-tree type architecture adder is, as partially shown in FIG. 4, an adder configured with one-bit adders arranged in a tree structure.

The register 140 in FIG. 2 is for temporarily storing the result of the operation performed in the processor 120, outputting it to the outside, and inputting it again to the multiplexer 110. The result of the operation stored in this register 140 is input again to the processor 120 via the multiplexer 110 in the case of giving fogging to texture mapped data.

The processing apparatus 100 having such a configuration performs processing in the mapping unit 35 of the three-dimensional image generator 3 such as texture mapping, fogging, and highlighting.

This processing will be explained next in more detail.

Note that, in the present embodiment, it is assumed that ordinary multiplication is performed at the time of texture mapping, processing for linear interpolation is performed at the time of fogging, and a product summation operation is performed at the time of highlighting.

When performing texture mapping, a mode control signal indicating the multiplication mode is input to the multiplexer 110. In response to this, the texture mapping data Rt is selected as the variable $\underline{A}$, the image data Rf of a side to which the texture is applied is selected as the variable $\alpha$, and 0 is selected as the variables $\underline{B}$ and $\underline{C}$, as explained above, in the, multiplexer 110 and output to the processor 120. As a result, the multiplication Rt×Rf is performed in the processor 120 for the texture mapping.

When performing fogging, a mode control signal indicating the linear interpolation mode is input to the multiplexer 110. In response to this, the data Rr before the fogging is selected as the variable $\underline{A}$, the fog coefficient $\underline{f}$ is selected as the variable $\alpha$, the fog color Rfg is selected as the variable $\underline{B}$, and 0 is selected as the variable $\underline{C}$ in the multiplexer 110 and input to the processor 120. As a result, the processing for linear interpolation [R×f+Rfg×(1−f)] is performed in the processor 120 to give a fog effect to each pixel. Note that, at this time, since correction as explained above is carried out in the processor 120, when the fog coefficient $\underline{f}$ is 1.0 (0×FF), the data before the fogging which is not affected at all by the fog color Rfg is output from the processor 120.

Further, when giving highlighting, a mode control signal indicating a product summation operation mode is input to the multiplexer 110. In response to this, the texture mapping data Rt is selected as the variable $\underline{A}$, the ambient light $\underline{D}$ is selected as the variable $\alpha$, 0 is selected as the variable $\underline{B}$, and the light E of a specified light source is selected as the variable $\underline{C}$ in the multiplexer 110 and input to the processor 120. As a result, the product summation operation [Rt×D+E] is performed in the processor 120 to give highlighting to each pixel.

In this way, in the processing apparatus 100 of the present embodiment, at the time of calculating [A×α+B×(1−α)] in the processor 120, correction is made by adding A when α is [0×FF] to enable elimination of the error in the result of the operation that usually occurs when α is [0×FF], that is, mathematically, when α=1.0.

Also, at the time of performing this correction, since the correction is carried out by replacing "+B" with "+A" in [A×α+B×⁻α+B] which is expanded from [A×α+B×(1−α)], this correction can be performed just by adding a selector for selecting $\underline{A}$ or $\underline{B}$ in accordance with the value of α.

Also, in this processor 120, because [A×α+B×(1−α)+C] can be calculated, all of the correction multiplication, the product summation operation, the processing for linear interpolation, etc. can be performed in accordance with values input as variables.

Also, at this time, since the processor 120 adds the partial products, the correction term, and the product summation operation term using wallace-tree type architecture adders, an increase of the circuit size and the delay time can be suppressed to a minimum. For example, when forming this processor 120 on an integrated circuit, the circuit of the processor 120 be realized without increasing the circuit area by suppressing the increase of the circuit area to the minimum.

Also, as a result, in the three-dimensional image generator 3 using this processing apparatus 100, when the fog coefficient $\underline{f}$ is 1.0 (0×FF), data before fogging which is not at all affected by the fog color Rfg can be obtained so suitable image data can be obtained.

Further, since all of the texture mapping, fogging, and highlighting can be performed by using this processing apparatus 100, for example when forming the three-dimensional image generator 3 on an integrated circuit, the circuit can be configured effectively and it becomes possible to provide a three-dimensional image generator 3 which is small in size and high in functions.

Note that the present invention is not limited to the above embodiments and that a variety of modifications can be made.

For example, in the processor 120 of the processing apparatus 100 explained above, $\underline{A}$ was selected as the correction term when α=0×FF (α=1.0), while $\underline{B}$ was selected in other cases. However, the correction term when α=0×FF (α=1.0) is not limited to $\underline{A}$. A proper correction can be made if the value is at least $\underline{A}$, so that, for example, [A+B] may be a correction term. Alternatively, any value which is sure to give $\underline{A}$ or more generated by another portion of the configuration may be the correction term in the case of α=0×FF.

Also, the adders 130 In the processor 120 were made to have a Wallace-tree type architecture, however so far as the aim is only to obtain suitable results of the operation, any configuration can be adopted for the adders. For example, an array type, a carry save type, or any other type of well known adder configuration can be used. Note that when considering the delay time and the circuit size, Wallace-tree type architecture adders as in the present embodiment are effective.

Further, in the processor 120 explained above, the explanation was made using an 8-bit processing system, however, the bit width of the variables etc. is not limited to 8 bits. Any bit width may be set such as 16 bits, 32 bits, etc.

Further, in the present embodiment, an example was given of application of the processor 120 to a three-dimensional image generator 3, but it may be applied to any apparatus.

Summarizing the effects of the invention, as explained above, according to the present invention, even in the case where the interpolation coefficient α is 1.0, a linear interpolation processing apparatus capable of carrying out operations to obtain the original data properly, capable of performing a product summation operation at a high speed, and suitable for formation on an integrated circuit without increasing the circuit size can be provided.

Also, it is possible to provide an image processing apparatus capable of performing image processing such as texture mapping, fogging, and highlighting effectively at a high speed and suitable for formation on an integrated circuit.

What is claimed is:

1. A signal processing apparatus for performing an operation {A×α+B×(1−α)}, wherein A and B are any values of a predetermined bit width and α is a coefficient with a value of 0≦α≦1 of a predetermined bit width, comprising:

an added value selecting means for selecting the value A as an added value F when α=1 and selecting the value B as said added value F when a α≠1;

a processing means for performing an {A×α+B×−α+F} where −α indicates a bit inversion of a based on said selected added value F; and means for obtaining the upper bits of the result of said operation using said selected values of A and B, wherein said processing means comprises:

a partial product generating means for selecting the value A when a bit of the coefficient α is 1 and selecting the value B when said bit is 0 for each bit of the coefficient α and generating a partial product by shifting said selected value to a position corresponding to said bit of α; and an adding means for adding said selected added value F and said generated partial products; and wherein said adding means is configured in a Wallace-tree architecture and is comprised of one-bit adders in a tree structure.

2. A signal processing apparatus for performing an operation $\{A \times \alpha + B \times (1-\alpha) + C\}$, where A, B, and C are any values of a predetermined bit width and α is a coefficient with a value $0 \leq \alpha \leq 1$ of a predetermined bit width, comprising:

an added value selecting means for selecting the value A as an added value F when α=1 and selecting the value B as said added value F when α≠1 and a processing means for performing an operation $\{A \times \alpha + B \times -\alpha + F + C\}$ (where −α indicates a bit inversion of α) based on said selected added value F; and means for obtaining the upper bits of the result of the operation, wherein said processing means comprises:

a partial product generating means for selecting the value A when a bit of the coefficient α is 1 and selecting the value B when said bit is 0 for each bit of the coefficient α and generating a partial product by shifting the selected value to the position corresponding to said bit of α; and an adding means for adding said selected added value F, said generated partial products, and said value C, and wherein said added value selecting means, said processing means, said partial product generating means, and said adding means are formed on an integrated circuit.

3. An image processing apparatus, comprising:

a processing apparatus for performing an operation $\{A \times \alpha + B \times (1-\alpha)\}$, wherein A and B are any values of a predetermined bit width and α is a coefficient with a value of $0 \leq \alpha \leq 1$ of a predetermined bit width, said processing apparatus comprising an added value selecting means for selecting the value A as an added value F when α=1 and selecting the value B as an added value F when α≠1 and a processing means for performing an operation $\{A \times \alpha + B \times -\alpha + F\}$ (where −α indicates a bit inversion of α) based on said selected added value F and an input control means for respectively inputting to said processing apparatus texture mapping data as said value A, image data of a side on which a texture is applied as said coefficient α, and as 0 as said value B during a predetermined first mode;

said processing means comprising a partial product generating means for selecting the value A when a bit of said coefficient α is 1 while selecting the value B when said bit is 0 for each bit of the coefficient α and generating a partial product by shifting said selected value to the position corresponding to said bit of said α, and an adding means for adding said selected added value F and said generated partial product.

4. An image processing apparatus as set forth in claim 3, wherein said input control means inputs to said processing apparatus pixel data as said value A, a fog coefficient as the coefficient α, and a fog color as the value B during a predetermined second mode.

5. An image processing apparatus, comprising:

a processing apparatus for performing an operation $\{A \times \alpha + B \times (1-\alpha) + C\}$, wherein A, B, and C are any values of a predetermined bit width and α is a coefficient with a value of $0 \leq \alpha \leq 1$ of a predetermined bit width, the processing apparatus comprising an added value selecting means for selecting the value A as an added value F when α=1 and selecting the value B as said added value F when α≠1 and a processing means for performing an operation $\{A \times \alpha + B + -\alpha + F + C\}$ (where −α indicates a bit inversion of α) based on said selected added value F; and an input control means for inputing to said processing apparatus texture mapping data as said value A, image data of a side on which a texture is applied as said coefficient α, and 0 as said values B and C during a predetermined first mode;

said processing means comprising a partial product generating means for selecting the value A when a bit of said coefficient α is 1 while selecting the value B when said bit is 0 for each bit of the coefficient α and generating a partial product by shifting said selected value to a position corresponding to said bit of α, and an adding means for adding a selected added value F, said generated partial product, and said value C.

6. An image processing apparatus as set forth in claim 5, wherein said input control means inputs to said processing apparatus pixel data as said value A, a fog coefficient as the coefficient α, a fog color as said value B, and 0 as said value C during a second mode.

7. An image processing apparatus as set forth in claim 5, wherein said input control means inputs to said processing apparatus texture mapping data as said value A, a value indicating an ambient light as said coefficient α, 0 as said value B, and a value indicating a specific light source as said value C during a predetermined third mode.

8. An image processing apparatus as set forth claim 5, wherein all of said means in said signal processing means are formed on an integrated circuit.

9. A system for generating three-dimensional images on a display based on image data, wherein said image data represents a framework of polygons each of which is filled with pixels, said system comprising:

an input portion for receiving said image data; and an image generator for generating said images from said image data and outputting a signal representing said images for a display device;

wherein said image generator comprises;

a processor for processing said image data;

a mapping portion for receiving said processed image data, mapping pixel data onto said framework based on said processed image data, and outputting completed image data to a memory unit; and a display control unit for converting said completed image data in said memory unit into a video signal for a display device;

wherein said mapping portion comprises a multiplexer;

a processor connected to said multiplexer; and a register receiving output from said processor;

where said processed image data input to said mapping portion includes a first variable Rt representing texture mapping data; a second variable Rf representing a portion of said framework to which said texture represented by Rt is to be applied, a third variable Rfg representing a fog color, a fourth variable f representing a fog coefficient, a fifth variable D representing ambient light and a sixth variable E representing a specific light source in said image, wherein said multiplexer receives said six variable and provided four values to said processor in response to a mode control signal received by said multiplexer, and wherein, in a second mode dictated by said mode control signal, said multiplexer provides said first variable Rt, said fifth variable D, and said sixth variable E as three of said four variables provided to said processor, wherein a fourth variable provided to said processor equals zero.

10. A system for generating three-dimensional images on a display based on image data, wherein said image data represents a framework of polygons each of which is filed with pixels, said system comprising:

an input portion for receiving said image data; and an image generator for generating said images from said image data and outputting a signal representing said images for a display device;

wherein said image generator comprises;

a processor for processing said image data;

a mapping portion for receiving said processed image data, mapping pixel data onto said framework based on said processed image data, and outputting completed image data to a memory unit; and a display control unit for converting said completed image data in said memory unit into a video signal for a display device, wherein said mapping portion comprises:

a multiplexer;

a processor connected to said multiplexer; and a register receiving output from said processor;

wherein said processed image data input to said mapping portion includes a first variable Rt representing texture mapping data; a second variable Rf representing a portion of said framework to which said texture represented by Rt is to be applied, a third variable Rfg representing a fog color, a fourth variable f representing a fog coefficient, a fifth variable D representing ambient light and a sixth variable E representing a specific light source in said image, wherein said multiplexer receives said six variables and provides four values to said processor in response to a mode control signal received by said multiplexer, and wherein in a first mode dictated by said mode control signal, said multiplexer provides said first variable Rt and said second variable Rf as two of said four variables provided to said processor, wherein third and fourth variables provided to said processor equal zero.

11. The system of claim 9, wherein in a third mode dictated by said mode control signal, said multiplexer provides said output of said register, said fourth variable f and the third variable Rfg as three of said four variable provided to said processor, wherein a fourth variable provided to said processor equal zero.

12. The system of claim 9, wherein said image data further comprises a coefficient with a value $0 \leq \  \geq 1$, wherein when $=1$, said processor adds a correction term to an operation being performed on said image data.

* * * * *

UNITED STATES PATENT AND TRADEMARK OFFICE
CERTIFICATE OF CORRECTION

PATENT NO. : 6,373,494 B1
DATED : April 16, 2002
INVENTOR(S) : Toshio Horioka

It is certified that error appears in the above-identified patent and that said Letters Patent is hereby corrected as shown below:

Column 10,
Line 60, "wherein -- a indicates a bit inversion of a based on said" should read
-- wherein -$\alpha$ indicates a bit inversion of $\alpha$ based on said --.

Column 14,
Line 28, "further comprises a coefficient with a value of $0 \leqq \geqq 1$," should read
-- further comprises a coefficient $\alpha$ with a value of $0 \leqq \alpha \geqq 1$, --.
Line 29, "wherein when =1, said processor adds a correction term to" should read
-- wherein when $\alpha$=1, said processor adds a correction term to --

Signed and Sealed this

Thirtieth Day of September, 2003

JAMES E. ROGAN
*Director of the United States Patent and Trademark Office*